(12) United States Patent
Polad

(10) Patent No.: US 6,349,904 B1
(45) Date of Patent: Feb. 26, 2002

(54) CABLE BUNDLING AND SUPPORT DEVICE

(76) Inventor: Arthur A. Polad, 2565 W. 2780 S. Lot 178, West Valley City, UT (US) 84119

( * ) Notice: Subject to any disclaimer, the term of this patent is extended or adjusted under 35 U.S.C. 154(b) by 0 days.

(21) Appl. No.: 09/079,690

(22) Filed: May 15, 1998

(51) Int. Cl.[7] .............................................. F16L 3/137
(52) U.S. Cl. .................... 248/74.3; 24/16 PB
(58) Field of Search .............................. 248/74.3, 74.5, 248/60, 205.2, 205.3, 316.5; 24/16 R, 16 PB

(56) References Cited

U.S. PATENT DOCUMENTS

| | | | | |
|---|---|---|---|---|
| 1,804,472 A | * | 5/1931 | Leslie .................... 248/60 X |
| 2,974,916 A | * | 3/1961 | Richey .................. 248/74.3 X |
| 3,050,578 A | * | 8/1962 | Huebner ................ 248/74.3 X |
| 3,157,377 A | | 11/1964 | Orenick ....................... 248/71 |
| 3,169,004 A | * | 2/1965 | Rapata ................... 248/74.5 X |
| 3,913,876 A | * | 10/1975 | McSherry ............. 248/205.3 X |
| 4,466,159 A | * | 8/1984 | Burrage ..................... 24/16 PB |
| RE31,689 E | | 10/1984 | Bulanda et al. ........... 24/16 PB |
| 4,592,734 A | * | 6/1986 | Metiver ................ 24/16 PB X |
| 4,706,914 A | * | 11/1987 | Ground ...................... 248/74.3 |
| 4,893,381 A | | 1/1990 | Frankel ....................... 24/16 R |
| 4,939,818 A | | 7/1990 | Hahn ......................... 24/16 R |
| 4,988,338 A | * | 1/1991 | Taylor et al. .......... 248/74.3 X |
| 5,031,282 A | | 7/1991 | Denaro ....................... 24/16 R |
| 5,048,158 A | | 9/1991 | Koerner ..................... 24/16 R |
| 5,075,932 A | | 12/1991 | Hunt et al. ................ 24/16 PB |
| 5,082,111 A | * | 1/1992 | Corbitt, Jr. et al. ... 248/205.3 X |
| 5,123,619 A | * | 6/1992 | Tomlinson et al. ......... 248/74.1 |
| 5,142,743 A | | 9/1992 | Hahn ......................... 24/16 R |
| 5,169,100 A | | 12/1992 | Milcent et al. ............. 248/68.1 |
| 5,263,671 A | * | 11/1993 | Baum .................... 248/74.3 X |
| 5,560,564 A | | 10/1996 | Maynard .................... 242/402 |
| 5,600,098 A | | 2/1997 | Kazaks ........................ 174/135 |
| 5,878,465 A | * | 3/1999 | Jenner ....................... 24/16 PB |

FOREIGN PATENT DOCUMENTS

GB       1338602    * 11/1973 ................ 248/74.5

OTHER PUBLICATIONS

Polygon Wire Management: Part 1225–25 (Pulled from Internet) author unknown.

Rip–Tie: CableCatch (Pulled from Internet) author unknown.

Cable Management Kits (catalog page from unknown source).

Cable Management Solutions (catalog page from unknown source).

* cited by examiner

Primary Examiner—Anita King
Assistant Examiner—Jon Szumny
(74) Attorney, Agent, or Firm—Mallinckrodt & Mallinckrodt; Brian R. Rayve

(57) ABSTRACT

An adjustable, removable, strap device primarily for use in bundling and holding electrical cords and cables, such as from office equipment or kitchen appliances, in a compact position above the floor or kitchen counter. Such compact, elevated position in an office helps to prevent tripping and in a kitchen keeps the cords off of the wet counter to reduce the risk of electrical shock, and which also provides a neat, tidy appearance. One embodiment of the device includes a flexible strap member having a plurality of headed pins at one end and a plurality of mating holes in the opposite end thereof. The strap member is doubled over on itself and the pins engaged in the holes to form a loop around the cables with the strap member permanently attached to the wall such as by a nail or double-sided adhesive tape, or removably other structure by means of hook and loop type fasteners. Two or more devices can be connected in a linear fashion to form a larger loop, or to form a right angle device with the addition of spaced notches at the edges thereof which engage adjacent pins for support, such as to route the cables vertically from an appliance then horizontally to a wall outlet. Another embodiment of the device has hook and loop fasteners in place of the pins and holes.

1 Claim, 4 Drawing Sheets

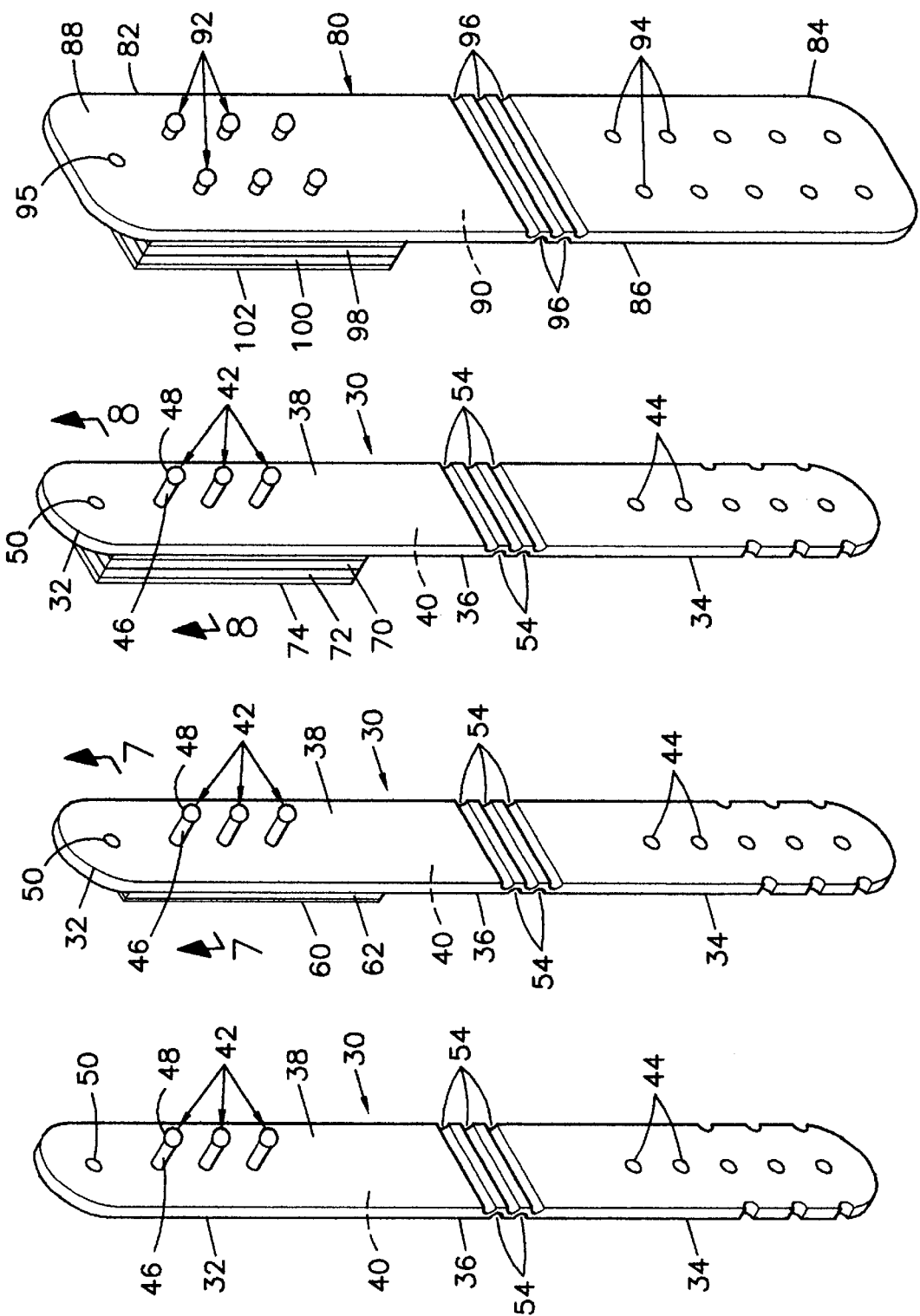

Figures 5, 6, 12:
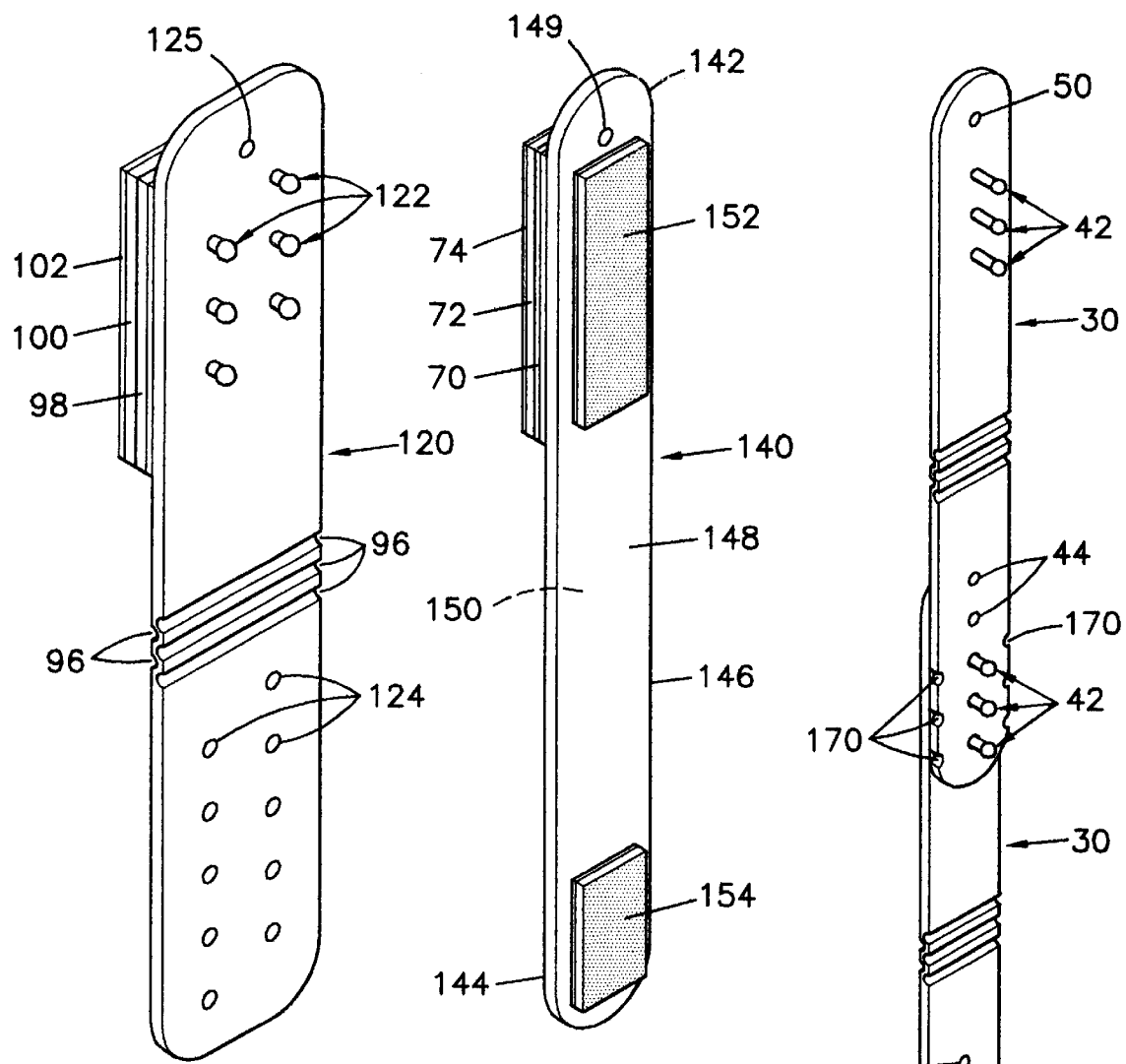

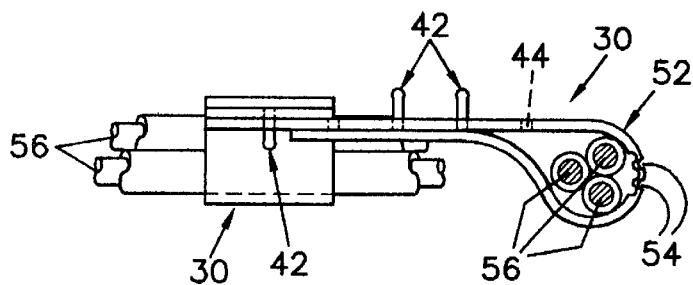
FIG. 15
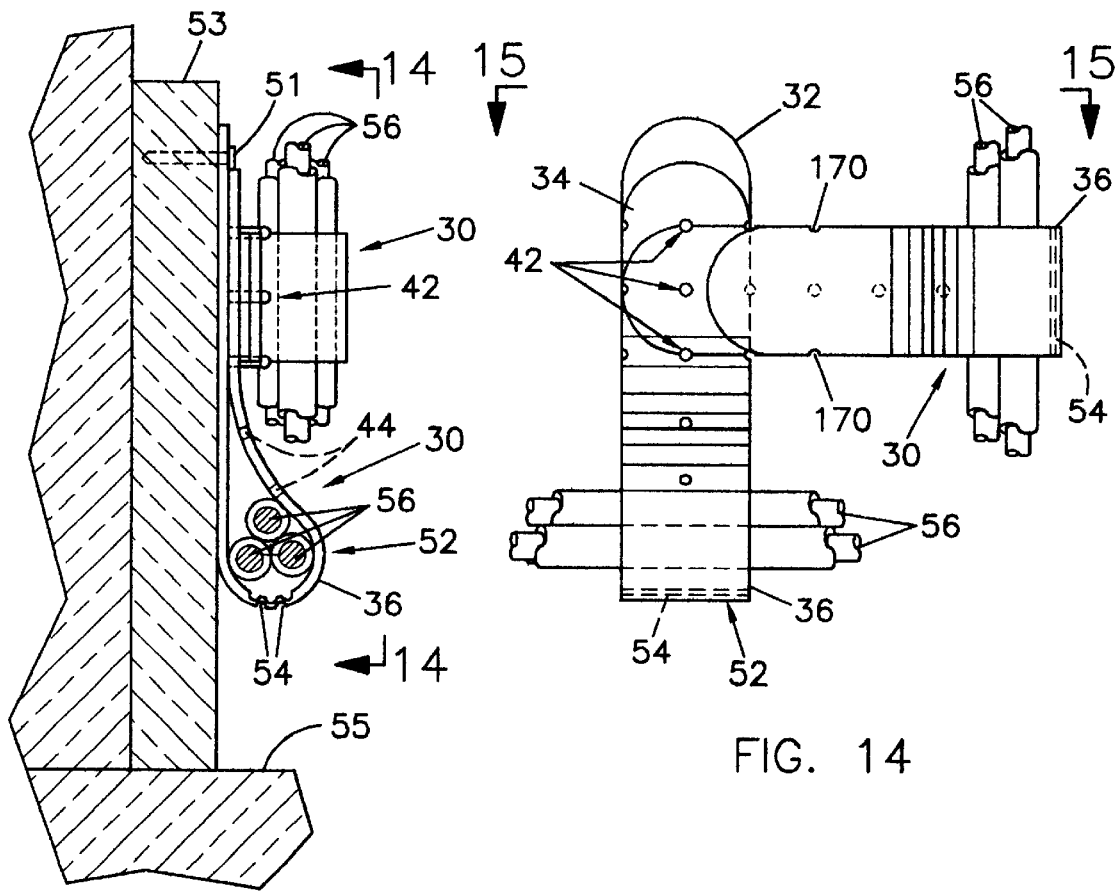
FIG. 14
FIG. 13

CABLE BUNDLING AND SUPPORT DEVICE

BACKGROUND OF THE INVENTION

1. Field

The invention is in the field of bundling and support devices of the type which attach to a wall, baseboard, door, or desk to support electrical power supply cords and computer cables off of the floor.

2. State of the Art

Over the past twenty years there has been a proliferation of new electronic and computer devices for the office and home. Such devices make work easier and quicker than prior methods but also create a vast proliferation of electrical power cords and cables, particularly so on desk-top computer systems which have many separate units which must be connected together by cables and many of which have individual power cords. Such cords and cables on computers and other devices are both unsightly and create a real danger of a person tripping over them. In an effort to alleviate such problems, cords and cables are typically pushed against walls, baseboards, and under desks with such efforts having only limited success. Power strips can be used such as at a computer in an attempt to minimize the number of cords running to a wall outlet, but themselves are quite bulky, relatively unsightly, and possibly presenting an even larger tripping hazard to persons than the cords and cables do themselves. Likewise, attempts to bundle cables with rubber bands, twist ties, and self-locking, ratcheting plastic ties are of limited success with such bundles typically remaining on the floor possibly creating an even larger tripping hazard. For example, U.S. Pat. No. 5,142,743 discloses an adjustable bundling device for wrapping and securing bundles of cable, rope, hose, and electrical power cords. The device includes a three-section strap to which hook and loop material is attached in various combinations. The device, however, is not made so as to attach to walls, baseboards, and desks to support such cables, etc. Other devices are commercially available which permanently attach to walls to hold cables, but which cannot be removed for ease of attaching the cables, then reattached to the wall.

SUMMARY OF THE INVENTION

In accordance with the invention, a cable bundling and support device primarily for use bundling and holding electrical and computer cables such as to walls, baseboards, and desks (hereinafter generally referred to as "walls") in an elevated position from the floor for greater tripping safety and for neater appearance. The device comprises an elongate, flexible strap member having fastening means for holding respective ends thereof juxtaposed to form a loop for holding the cables, and attachment means for preferably removably attaching the strap member such as to a wall, baseboard, or desk.

The fastening means can comprise a plurality of pins in various positions, preferably aligned in single or multiple rows, extending from one surface thereof, with a plurality of matching holes in corresponding positions, preferably in single or multiple rows, through the opposite end thereof. The pins have bodies of sufficient length to extend through at least one thicknesses of the strap member with heads of slightly larger size than the holes such that once the head extends from the hole, the pins remain holding the strap member in the looped form until forced therefrom. A plurality of hinge grooves can be formed preferably in the center portion of the strap member to aid in the bending thereof. The fastening means can also comprise interlocking hook and loop type fasteners, with a first type of interlocking fastener adhesively attached to the top front surface of the strap member and the second type of interlocking fastener adhesively attached to the bottom front surface of the strap member. When the strap member is bent into a loop such that the two types of fasteners contact, the loops and hooks interlock to maintain the looped position.

The attachment means can also include a hole through the top portion of the strap member for insertion of a nail or screw which is driven such as into a wall, or double-sided tape attached to the top portion and having a removable paper backing which is removed prior to attachment to such wall. The preferred attachment means is a first type of interlocking fastener affixed to the back of the top portion of the strap member and an adhesive-backed second type of interlocking fastener which has a removable backing paper which is removed prior to attachment to a wall. Such attachment allows the strap member to be removed from such wall prior to inserting or removing cables therefrom.

While the device is primarily designed for bundling and supporting cables of the size used on appliances and computers, larger versions can be constructed such as to nail to telephone poles to hold large electric cables. Other uses for the device include attaching such as to a wall or door to support coat hangers with cloths, attaching to walls above the counter in a kitchen to bundle and support cords above the potentially wet counter, and any other application wherein the loop can hold the particular object. The color of the strap member can be made to match or contrast with the decor of the environment in which it is used. Clear versions with or without flecks of colored particles therein can be made such as for children's rooms.

THE DRAWINGS

Figures 7, 8:
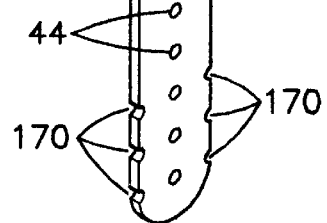
Figure 9:
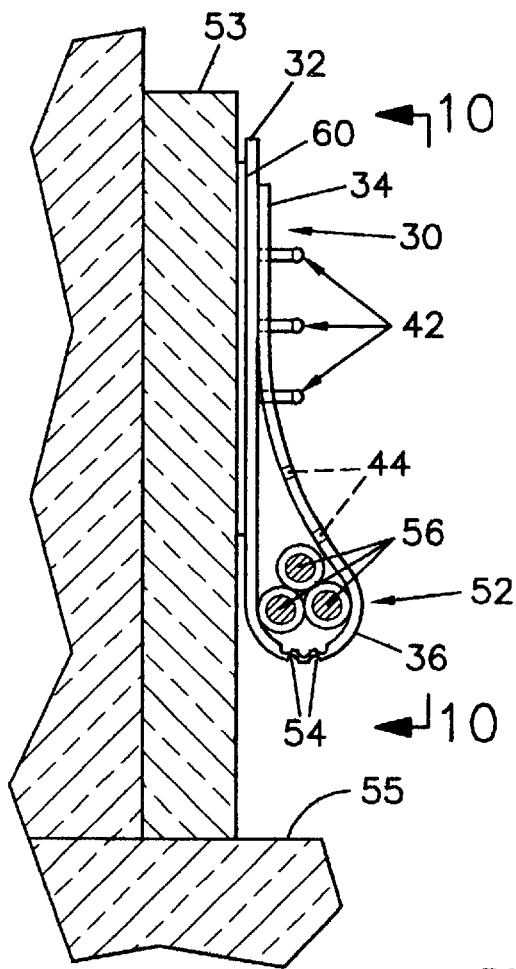
Figure 10:
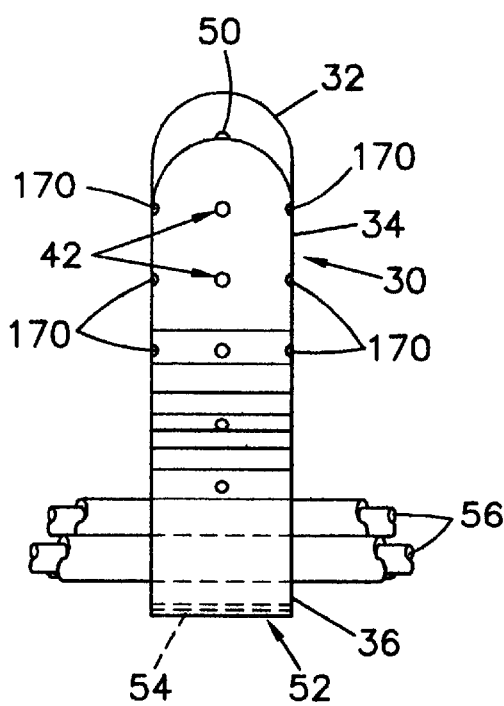
Figure 11:
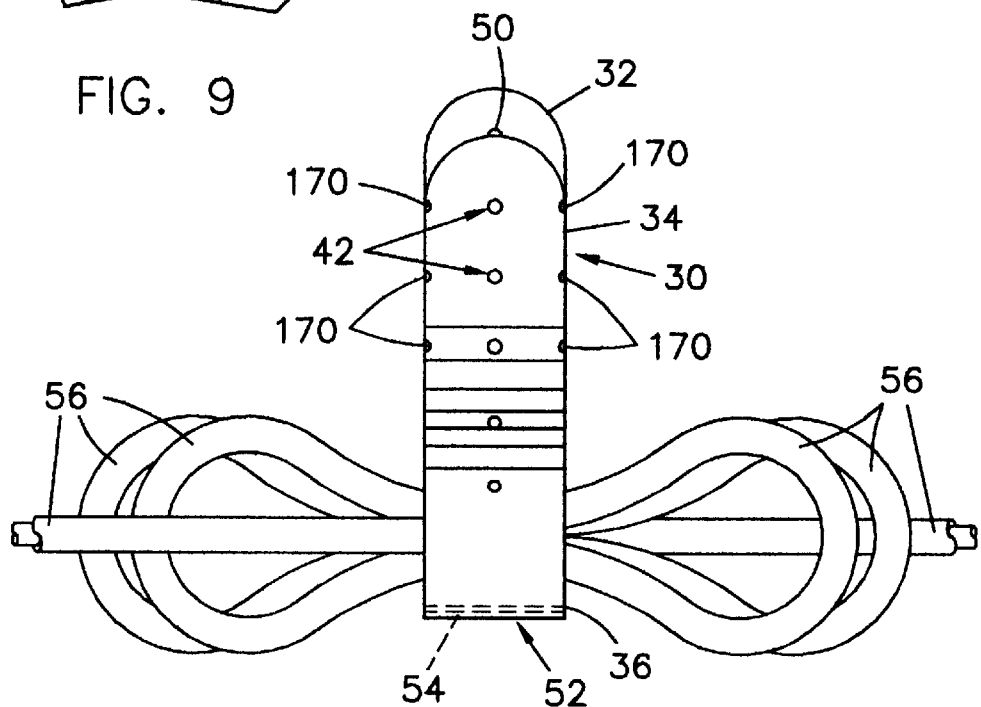

The best mode presently contemplated for carrying out the invention is illustrated in the accompanying drawings, in which:

FIG. 1 is a perspective view of a first embodiment of the invention having a single row of pins and holes and a hole for a nail such as for attachment to a wall;

FIG. 2, a perspective view of a second embodiment of the invention having a paper-covered adhesive strip for attachment to a wall;

FIG. 3, a perspective view of a third embodiment of the invention which has mating removable attachment material on the strap member and a paper-covered mating material for attachment to a wall;

FIG. 4, a perspective view of a fourth embodiment of the invention that is similar to the third embodiment of FIG. 3, but which has double rows of pins and holes;

FIG. 5, a perspective view of a fifth embodiment of the invention that is similar to the fourth embodiment of FIG. 4, but which has the double rows of pins and holes in a staggered relationship;

FIG. 6, a perspective view of a sixth embodiment of the invention that is similar to the third embodiment of FIG. 3, but wherein the plurality of pins and holes are replaced by mating removable attachment material;

FIG. 7, an enlarged lateral vertical sectional view taken on the line 7—7 of FIG. 2 showing the paper-covered adhesive strip for attachment to a wall;

FIG. 8, an enlarged lateral vertical sectional view taken on the line 8—8 of FIG. 3 showing the mating removable attachment material;

FIG. 9, a side elevational view of the second embodiment of FIG. 2 as adhesively attached to a wall holding a plurality of cables;

FIG. 10, a front elevational view taken on the line 10—10 of FIG. 9 showing the cables extending through the loop;

FIG. 11, a front elevational view of the first embodiment of the invention of FIG. 1 showing the cables looped therein to hold extra cable;

FIG. 12, a perspective view of two of the first embodiment of the invention attached together in series to form a longer loop for holding more cable;

FIG. 13, a side elevational view of two of the first embodiment of the invention attached together at right angles to hold cable at right angles such as at a corner;

FIG. 14, a front elevational view taken on the line 14—14 of FIG. 13 showing the attachment together including the side notches which maintain the orientation by engaging the pins;

FIG. 15, top plan view taken on the line 15—15 of FIG. 14 showing the attachment together and closure of the two loops.

DETAILED DESCRIPTION OF THE ILLUSTRATED EMBODIMENTS

Referring to FIG. 1, therein is shown the first embodiment of the invention which comprises a flexible strap member 30 having a top portion 32, a bottom portion 34, and a middle portion 36. All of the flexible strap members of the invention can be made of plastic, plastic laminated paper, or other flexible material known in the art, with injection-moldable plastics being preferred. Strap member 30 has a front surface 38 and a back surface 40. A fastening means which comprises at least one headed pin 42 extending from front surface 42 at top portion 32, and at least one hole 44 through bottom portion 34 for receiving pin 42. Pin 42 and hole 44 can be generally square, rectangular, or other shape in cross-section so long as they releasibly attach together, but are preferably generally circular in shape and pin 38 being generally circular in lateral cross-section along its length including a body 46. Body 46 can be made of a length preferably slightly longer than a multiple of one, two, or three thicknesses of strap member 30 to allow single or multiple straps 30 to be attached thereto. Body 46 is also preferably of a smaller diameter than hole 44 and which terminates in a head 48 of larger diameter than hole 44 to secure pin 38 in hole 44. An attachment means for mounting strap member 30 to a wall includes a hole 50 for insertion of a screw or nail 51 to mount strap member 30 to a wall or other supporting structure 53, above floor 55, such that cables 56 do not present a tripping hazard by lying on floor 55. (FIG. 13).

Referring to FIGS. 9, 10, and 11, in use, strap member 30 is bent primarily at middle portion 36 such that one or more of pins 42 engage and extend through a respective hole 44 such that head 48 extends beyond back surface 40, with strap member 30 forming a loop 52 for supporting cords or cables 56 extending therethrough in a linear manner, or looped so as to hold excess cable 56. Center portion 36 can include one or more hinge grooves 54 in front surface 38 and/or rear surface 40 to aid center portion 36 in bending more easily. Hinge grooves 54 configurations include placement on one surface only, on both sides and staggered as shown, or on both sides and aligned across from each other.

Referring to FIGS. 2, 9, and 10, an alternate attachment means for mounting strap member 30, rather than using a screw or nail through hole 50, comprises an adhesive means, preferably double-sided adhesive tape 60, which is fastened to back surface 40 at top portion 32. Such adhesive means can include an adhesive, or other means such as single-sided adhesive tape, with the non-sticky side attached to strap member 30 such as by separate a separate adhesive, riveting, or heat-bonding. A releasible backing paper 62 can be provided for the adhesive means to prevent inadvertent adhesion, which paper is removed prior to attachment to a wall.

Referring to FIG. 3, another alternate attachment means is shown which comprises a first type of interlocking material 70, preferably adhesive-backed, which is fastened to back surface 40 at top portion 32 such as by an adhesive, riveting, or heat-bonding. A second type of interlocking material 72, preferably adhesive-backed, releasibly connects to first type interlocking material 70 and preferably adhesively attaches to a wall, though other means such as separate adhesives, screws, nails, and the like may be used. A releasible backing paper 74 can be provided for the adhesive backing to prevent inadvertent adhesion, which paper 74 is removed prior to attachment to a wall. The first and second type interlocking materials 70 and 72 are preferably VELCRO brand hook and loop material, the hooks thereof which releasibly interlock with the loops thereof to form a junction therebetween which is extremely strong in shear, but easily releasible in the direction perpendicular thereto. Likewise, VELCRO brand hook and loop material is the preferred first and second interlocking materials in the other embodiments using such fastening and attachment means. This allows strap member 30 to be released from the wall during insertion and removal of cables therefrom which is easier than if strap member 30 is permanently nailed, screwed, or glued to a wall. Upon completion of the insertion or removal of cables therefrom, strap member 30 is reattached to the wall.

In FIG. 4 is shown an alternate embodiment of the invention, primarily for holding heavier cables, which is similar to that shown in FIG. 3, and which comprises a wide strap member 80 having a top portion 82, a middle portion 86, and a bottom portion 84. Wide strap member 80 also has a front surface 88 and a back surface 90. A fastening means which comprises two or more rows of side-by-side headed pins 92, of the same construction as pins 42, of sufficient length to extend through one, two, three, or more thicknesses of strap member 80, extending from front face 88 at top portion 82, and two rows of holes 94, of the same shape and proportionate size as holes 44, through bottom portion 84 for receiving pins 92. A hole 95 may be included in strap member 80 for using a nail or screw (not shown) to mount strap member 80 such as to a wall. Center portion 86 can include one or more hinge grooves 96 in front surface 88 and rear surface 90 to aid center portion 84 to bend more easily. Hinge grooves 96 can be on one or on two sides and staggered as shown aligned. The attachment means is preferably the same as for the embodiment of FIG. 3 though any of the other attachment means can be used, comprising a first type interlocking material 98, preferably adhesive-backed, which is fastened to back surface 90 at top portion 82 such as by an adhesive, riveting, or heat bonding. A second type of interlocking material 100, preferably adhesive-backed, releasibly connects to first type interlocking material 90 and preferably adhesively attaches to a wall, though other means such as separate adhesives, screws, nails, and the like may be used. A releasible backing paper 102 can be provided for the adhesive backing to prevent inadvertent adhesion, which paper 102 is removed prior to attachment to a wall.

In FIG. 5 is shown an alternate embodiment of the invention comprising a wide strap member 120 of similar construction to strap member 80, but having the fastening means which comprise two rows of staggered headed pins 122, typically of the same construction as pins 42 and 92, and two rows of staggered holes 124, typically of the same shape and size as holes 44 and 94, for receiving pins 122. A hole 125 may be included for mounting strap member 120 using a nail or screw (not shown). The attachment means are the same as for the previous wide strap member 80 above.

Referring to FIG. 6, therein is shown an embodiment of the invention which comprises a flexible strap member 140 having a top portion 142, a bottom portion 144, and a middle portion 146. Strap member 140 also has a front surface 148 and a back surface 150. A hole 149 can be included for mounting strap member 140 using a nail or screw (not shown). The fastening means for this embodiment preferably comprises a first type of interlocking material 152, preferably adhesive-backed, which is fastened to front surface 148 at top portion 142 such as by an adhesive, riveting, or heat-bonding. A second type of interlocking material 154, preferably adhesive-backed, is fastened to front surface 148 at bottom portion bottom portion 144, which first and second types releasibly connect top and bottom portions 142 ad 144 of strap member 140 together to form a loop (not shown) as in the previous embodiments of the invention. Center portion 146 can include one or more hinge grooves (not shown) in front surface 148 and rear surface 150 to aid center portion 146 to bend more easily, which grooves can be on one side, or both sides, staggered or aligned. The attachment means is first type interlocking material 70, preferably adhesive-backed, which is fastened to back surface 150 at top portion 142 such as by an adhesive, riveting, or heat-bonding. Second type interlocking material 72, preferably adhesive-backed, releasibly connects to first type interlocking material 70 and preferably adhesively attaches to a wall, though other means such as separate adhesives, screws, nails, and the like may be used. Releasible backing paper 74 can be provided for the adhesive backing to prevent inadvertent adhesion, which paper 62 is removed prior to attachment to a wall.

Referring to FIG. 12, two or more strap members can be linearly connected to form a loop (not shown) of a larger size than when using a single strap member by attaching pins 42 of one of strap members 30 to holes 44 of the other of strap members 30. One of strap members 30 can then be attached such as to a wall (not shown) and a loop formed by engaging one or more of the pins 42 of one strap member 30 to the holes 44 of the other strap member 30. Two or more of strap members 80 or of strap members 120 can likewise be linearly attached together in a similar manner to form a larger loop (not shown).

Referring to FIGS. 13, 14, and 15, one or more pairs of notches 170 at opposite sides of strap member 30 can be cut from or molded into strap member 30, the distance between which notches being the same as the spacing of pins 42, such that multiple strap members 30 can be attached together at right angles. In such a configuration, notches 170, bearing against pins 42, provide support to maintain the right angle configuration of the strap members 30. The attachment of two straps 30 together at a right angle is particularly useful such as for routing cables 56 vertically from an electrical device (not shown) and then horizontally to a wall outlet (not shown). Likewise, if the spacing between pins 92 in the rows and of holes 94 in the rows is the same as the spacing between rows, and the pins 92 preferably lengthened similar to pins 42, two or more straps 80 can be attached together at right angles. The same can be done for strap 120 for right angle attachment together. When two rows of pins and holes are used, notches such as 170 are not needed to retain the right angle orientation. All of the straps can also be designed to attach at other than right angles be adjusting the respective pin positions, hole positions, and notch positions if needed.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A cable bundling and support device for attachment to the surface of a wall, comprising:

a flexible strap member having a top portion, a middle portion, and a bottom portion, each of which include front and back surfaces;

means for removably fastening said bottom portion to said top portion, with the respective front surfaces thereof juxtaposed, to form a loop for bundling and supporting cables;

means for attaching said bottom surface of said top portion to the surface of the wall; and wherein the fastening means comprises at least three pins extending generally perpendicularly from the front surface of the top portion, said pins having a body which terminates in a head spaced from said front surface, said head having a larger lateral cross-sectional area than said body, and a corresponding aperture for each pin extending through the bottom portion, with said aperture having a cross-sectional area of less than that of the head of the corresponding pin and including at least a pair of notches at opposite sides of the flexible strap member of sufficient size such that two of said flexible strap members can be connected together at a right angle with a pin of one flexible strap member through a hole of the other flexible strap member and the two pins adjacent thereto disposed in a respective notch of said second flexible strap member.

* * * * *